United States Patent [19]

Kuwayama et al.

[11] Patent Number: 4,903,550
[45] Date of Patent: Feb. 27, 1990

[54] HYDRAULIC CONTROL DEVICE FOR AUTOMATIC TRANSMISSION

[75] Inventors: Yoshinari Kuwayama, Tokoname; Fumitomo Yokoyama, Anjo; Masakatsu Miura, Kariya, all of Japan

[73] Assignee: Aisin-Warner Kabushiki Kaisha, Anjo, Japan

[21] Appl. No.: 181,149

[22] PCT Filed: Jun. 26, 1987

[86] PCT No.: PCT/JP87/00431
§ 371 Date: Mar. 1, 1988
§ 102(e) Date: Mar. 1, 1988

[87] PCT Pub. No.: WO88/00302
PCT Pub. Date: Jan. 14, 1988

[30] Foreign Application Priority Data

Jul. 1, 1986 [JP] Japan ................... 61-154693

[51] Int. Cl.$^4$ .......................................... B60K 41/06
[52] U.S. Cl. ........................................ 74/869; 74/867
[58] Field of Search ........................ 74/869, 868, 867

[56] References Cited

U.S. PATENT DOCUMENTS

| 3,871,250 | 3/1975 | Miyauchi et al. | 74/869 |
| 4,346,626 | 8/1982 | Kawamoto | 74/869 X |
| 4,512,212 | 4/1985 | Ishikawa | 74/869 X |
| 4,573,375 | 3/1986 | Hamada et al. | 74/867 X |
| 4,663,992 | 5/1987 | Fujiura et al. | 74/869 |
| 4,677,878 | 7/1987 | Yamamori et al. | 74/868 X |
| 4,697,478 | 10/1987 | Mastumoto et al. | 74/860 X |
| 4,721,018 | 1/1988 | Harada et al. | 74/867 X |
| 4,722,247 | 2/1988 | Shindo et al. | 74/867 X |
| 4,729,266 | 3/1988 | Mishima et al. | 74/869 |
| 4,776,240 | 10/1988 | Miki | 74/869 |

FOREIGN PATENT DOCUMENTS

| 57-37140 | 3/1982 | Japan . | |
| 57-146943 | 9/1982 | Japan . | |
| 59-180149 | 11/1984 | Japan . | |
| 60-175939 | 11/1985 | Japan . | |
| 2036894 | 7/1980 | United Kingdom | 74/867 |

Primary Examiner—Leslie A. Braun
Assistant Examiner—Christopher Campbell
Attorney, Agent, or Firm—Wenderoth, Lind & Ponack

[57] ABSTRACT

A hydraulic control device for an automatic transmission, having a gear ratio different from that of usual D range by a manual shift down from the D range to range 3 or 2, is mounted on an automobile. A first solenoid valve, a first shift valve and a second shift valve are connected so that the first solenoid valve controls the first and second shift valves. A second solenoid valve, a third shift valve and a down shift control valve are connected so that the second solenoid valve controls the third shift valve and the down shift control valve. Oil paths through which line pressure is applied in accordance with the range at which the manual valve is set are connected to certain shift valves, so that motions of the valves in the shift valves and the down shift control valve are constrained in accordance with the set range of the manual valve.

8 Claims, 4 Drawing Sheets

FIG.4

| POSITION | | SOLENOID | | | | CLUTCH | | | | BRAKE | | | | O.W.C | | | |
|---|---|---|---|---|---|---|---|---|---|---|---|---|---|---|---|---|---|
| | | S1 | S2 | S3 | S4 | $C_0$ | $C_1$ | $C_2$ | $C_3$ | $B_1$ | $B_2$ | $B_3$ | $B_4$ | $F_0$ | $F_1$ | $F_2$ | $F_3$ |
| P | | × | ○ | × | | | | | | | | | ○ | | | | |
| R | STOPPING | × | ○ | × | | | ○ | | | | | ○ | ○ | | | | |
| | RUNNING | ○ | ○ | × | | | ○ | | | | | × | ○ | | | | |
| N | | × | ○ | × | | | | | | | | | ○ | | | | |
| D | idle | × | ○ | ○ | | △ | | | | ○ | | | ○ | | | | |
| D | 1ST | × | ○ | × | | | ○ | | | | | | ○ | | | ○ | ○ |
| | 2ND | ○ | ○ | × | ◎ | | ○ | | | ○ | | | ○ | | ○ | | ○ |
| | 3RD | ○ | × | × | ◎ | | ○ | ○ | | ○ | | | | | ○ | | |
| | 4TH | × | × | × | ◎ | ○ | ○ | | | ○ | | | | | | | |
| | 5TH | × | × | ○ | ◎ | ○ | | | | | ○ | ○ | | ○ | | | |
| 3 | 1ST | × | ○ | × | | | ○ | | | | | | ○ | ○ | | ○ | ○ |
| | 2ND | ○ | ○ | × | ◎ | | ○ | | | ○ | | | ○ | | ○ | | ○ |
| | 3RD | × | × | × | ◎ | ○ | ○ | | | ○ | | | ○ | | | | ○ |
| | 4TH | × | × | ○ | ◎ | ○ | | | | ○ | ○ | | ○ | ○ | | | |
| 2 | 1ST | × | ○ | × | | | ○ | | | | | ○ | ○ | | | ○ | ○ |
| | 2ND | × | × | × | | | ○ | | ○ | | | ○ | | | | ○ | |
| | (2ND) | ○ | ○ | × | | | ○ | | | ○ | ○ | | ○ | | ○ | | ○ |
| | (3RD) | ○ | × | × | | | ○ | | ○ | ○ | ○ | | | | ○ | | |
| 1 | 1ST | × | ○ | × | | | ○ | | | | | ○ | ○ | | | ○ | ○ |
| | (2ND) | × | × | × | | | ○ | | ○ | | | ○ | | | | ○ | |
| | (3RD) | ○ | × | × | | | ○ | | ○ | ○ | ○ | | | | ○ | | |

| REMARKS | | |
|---|---|---|
| ○ | ON | |
| × | OFF | |
| ◎ | ON: L-UP ON / OFF: L-UP OFF | |
| △ | PRESSURE REDUCTION | |

HYDRAULIC CONTROL DEVICE FOR AUTOMATIC TRANSMISSION

BACKGROUND OF THE INVENTION

1. Field of the Invention

The present invention relates to a hydraulic control device particularly designed for an automatic transmission of an automobile having a multiple speed transmission such as a five speed automatic transmission, and in detail relates to a hydraulic control device for setting gear ratios which are different from those of a conventional automatic drive range during a "manual-shift-down" such as from Drive to 3rd, 2nd and 1st range by a shift lever.

2. Description of the Prior Art

An automatic transmission, in general, performs a shift down operation through an ordinary gear ratio as well as manual shift down performed by a shift lever to reduce the speed of a vehicle on a long down slope and when passing other cars.

An applicant of the present invention, as shown in the Japanese Pat. No. 57-37140, proposed an automatic transmission having a sub-transmission mechanism (two forward speeds) and a main-transmission mechanism (three forward speeds), with the transmission of both sub and main transmission mechanisms operated by respective shift valves, which makes possible an automatic transmission having six forward speeds. The thus proposed automatic transmission has six forward speeds in the Drive range from the combination of sub and main transmission mechanisms, while on the other hand, the automatic transmission has three forward speeds in the combined intermediate and low ranges when the submechanism is not used.

Accordingly, a conventional three or four forward speed automatic transmission only regulates shifting to a higher speed with an ordinary gear ratio and cannot select a suitable gear ratio for the running condition even though manual shift down is performed to obtain higher acceleration when passing other vehicles or applying the engine as a brake when a vehicle is running on a long down slope.

Furthermore, a multiple speed automatic transmission device having a main transmission mechanism and a sub transmission mechanism can have different shifting patterns in the Drive range and the intermediate and low ranges; however, in such an arrangement, three solenoid valves are required for first, second and third shift valves respectively. Incorporating expensive solenoid valves in the system causes the total cost of the automatic transmission to increase.

OBJECT AND BRIEF SUMMARY OF THE INVENTION

It is the object of the present invention to provide a hydraulic control device capable of providing shifting pattens different from ordinary shift patterns by manual shifting operations, but in which the number of solenoid valves is not increased beyond the number employed normally. To this end, there is provided a hydraulic control device which can be applied, for example, to a five speed automatic transmission with four selectable gear ranges D-3-2-1, and in which first and second solenoid valves are provided to constrain first, second and third shift valves and the down shift control valve in accordance with a certain range of movement of the manual valve. Because of the above arrangement, the structure of the hydraulic control device is kept simple and does not require adding expensive solenoid valves. Furthermore, a multiple speed transmission is provided which has different types of shift patterns having gear ratios different from an ordinary automatic transmission when manual shift down is performed. Because the hydraulic control device is simple and compact, in addition to having high fuel efficiency, suitable braking with the engine and suitable acceleration are obtained.

BRIEF DESCRIPTION OF THE DRAWINGS

FIG. 4 is an operation table showing the operation of the device of FIG. 3.

DESCRIPTION OF THE PREFERRED EMBODIMENT

Figure 1:
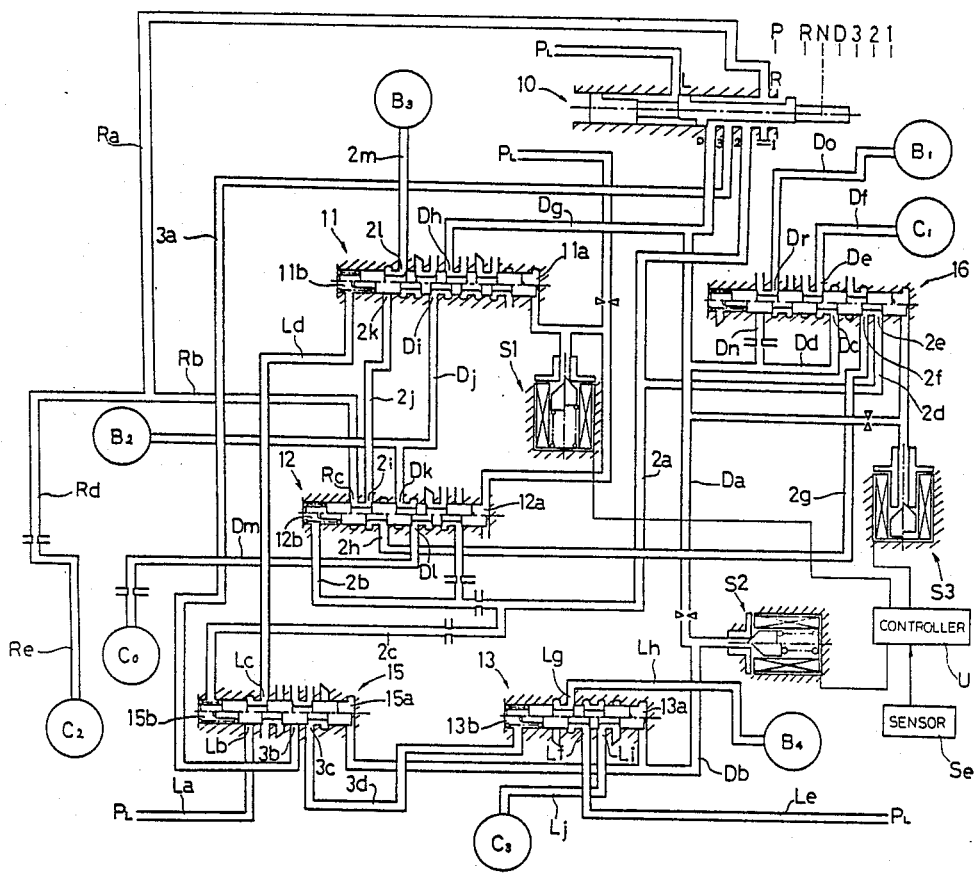
FIG. 1 is a schematic sectional view of a main portion of a hydraulic control device in accordance with the present invention.

The following is a description of an embodiment in accordance with the present invention.

A hydraulic control device according to the invention has hydraulic servos C for clutches, and hydraulic servos B for brakes which engage or disengage certain components of a transmission gear mechanism; a first shift valve 11, a second shift valve 12 and a third shift valve 13 which control oil supplied to each servo; and first solenoid valve S1, a second solenoid valve S2 and a down shift control valve 15.

The first solenoid valve S1 controls the line pressure $P_L$ to the first and second shift valves 11 and 12, and the second solenoid valve S2 controls the line pressure $P_L$ to the third shift valve 13 and the down shift control valve 15. At a certain position of a manual valve 10 (for example, the position for 3 or 2 speed range), oil paths are connected to certain shift valves and the down shift control valve to constrain the motions of the shift valves and the down shift control valve corresponding to the positions of the manual valve 10.

With such a structure, when the manual valve 10 is positioned at the D range, the first solenoid valve S1 controls the first shift valve 11 and the second shift valve 12, and the second solenoid valve S2 controls the third shift valve 13 and the down shift control valve 15. In accordance with this motion of the valves, appropriate brakes and clutches are actuated and automatic transmission is performed.

When the manual valve 10 is positioned at the 3 range, line pressure $P_L$ is applied to the port 3 as well as the port D, and the line pressure to the port 3 is applied through oil path 3a to the port 3b of the down shift control valve 15. The second solenoid valve S2 is shifted to the off position so that the line pressure from the port D is applied to the oil path Db, and the line pressure is applied to the right control oil chamber 13a of the third shift valve 13 and moves the spool thereof; however, the line pressure of the oil path Db is also applied to the right control oil chamber 15a of the down shift control valve 15 which shifts the valve 15 to the left to an "upper half position" as shown in the upper half of the drawing, so that the line pressure of the port 3b is applied to the left control oil chamber 13b of the third shift valve 13 through the port 3c and the oil path 3d. The valve 13 is kept at a "lower half position" shown in the lower half of the drawing by a balance of a spring and the line pressure.

At this time, line pressure in the oil path La is applied through the port Lb, down shift control valve 15, port Lc and the oil path Ld to the left control oil chamber 11b of the first shift valve 11; consequently, the valve 11 is held in the "lower half position". This means that the valve 11 does not change its position no matter which condition (ON or OFF) the first solenoid valve S1 has, and only the second shift valve 12 is controlled.

When the manual valve 10 is positioned at the 2 range, line pressure is applied to the port 2 as well as the port D and port 3, the line pressure of the port 2 is applied through the oil path 2a and oil path 2b to the left control oil chamber 12b, so that the valve 12 is held in the "lower half position", and at the same time, line pressure runs through the oil path 2c to the left control oil chamber 15b of the down shift control valve 15. The valve 15 is thus held in the "lower half position".

Figure 2:
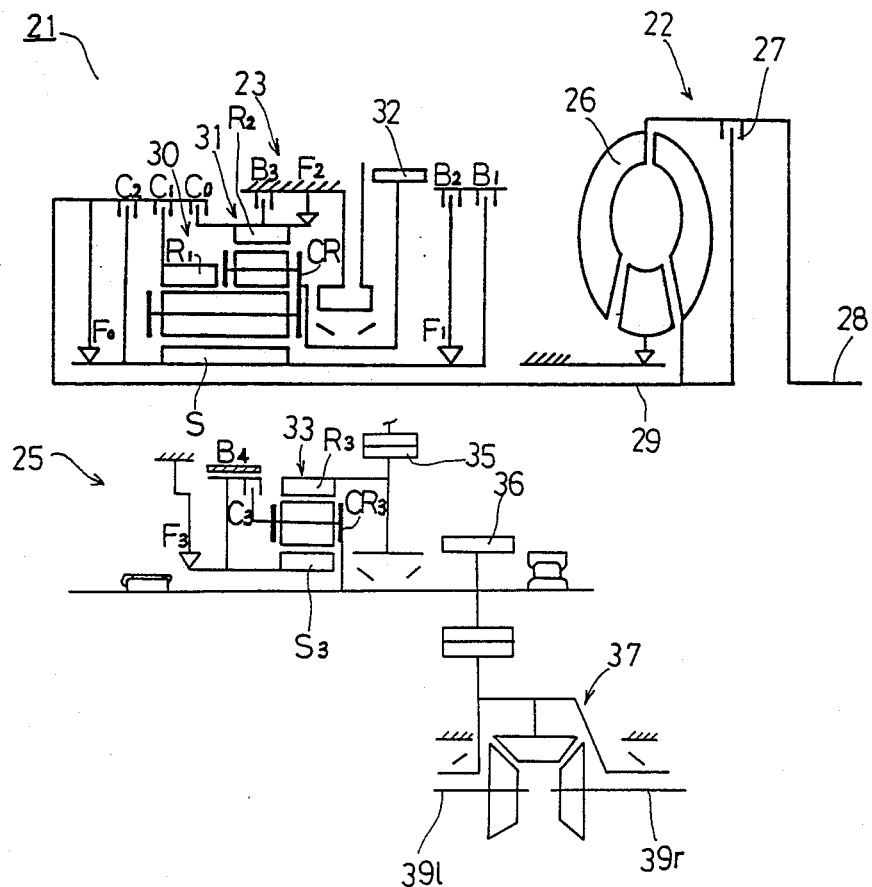
FIG. 2 is a schematic view of an automatic transmission mechanism to which the control device of the present invention is applicable.

A five speed automatic transmission 21 to which the hydraulic control device is applicable comprises a torque converter portion 22, a four speed automatic transmission mechanism portion 23 and an underdrive mechanism portion 25, as shown in FIG. 2.

The torque converter portion 22 has a torque converter 26 and a lock-up clutch 27. An engine crankshaft 28 is connected to an input shaft 29 through oil flow in the torque converter 26 or through a mechanical coupling by the lock-up clutch 27.

The four speed automatic transmission mechanism portion 23 has a single planetary gear unit 30 and a dual planetary gear unit 31. Each gear unit has a carrier CR and a sun gear S. These carriers CR are connected to one another as an integrated body; and the sun gears are also connected to one another as an integrated body. Still further, the input shaft 29 is connected to the ring gear $R_1$ of the single planetary gear unit 30 through the first (forward) clutch $C_1$ and also connected to the sun gear S through the second clutch $C_2$; and the sun gear S is restrained directly by the first brake $B_1$ and the rotation of the sun gear S in one direction is regulated by the second brake $B_2$ through the first one-way clutch $F_1$; and the ring gear $R_2$ of the dual planetary gear unit 31 is restrained directly by the thrid brake $B_3$ and the rotation of the ring gear $R_2$ in one direction is regulated by the second one-way clutch $F_2$. Furthermore, the input shaft 29 is connected to the ring gear $R_2$ of the dual planetary gear 31 through the third clutch $C_0$ and the third one-way clutch $F_0$ is arranged between the input shaft and the sun gear S in order to regulate the rotation of the sun gear so that it does not exceed that of the input shaft 29. Further, the carrier CR is connected to the counter drive gear 32 which is the output number of the four speed automatic transmission mechanism portion 23.

On the other hand, the underdrive mechanism portion 25 has a single planetary gear unit 33, a ring gear $R_3$ connected to a counterdriven gear 35 always engaging with the counterdrive gear 32, and carrier $CR_3$ is connected to the output pinion 36. Further, the rotation of the sun gear $S_3$ is regulated in one direction by the fourth one-way clutch $F_3$; and the sun gear $S_3$ is restrained by the fourth brake $B_4$ and is connected to the carrier $CR_3$ through the fourth clutch $C_3$.

As for the output pinion 36, it is connected to the right and left axes 39r, 39l through the differential device 37.

Figure 3:
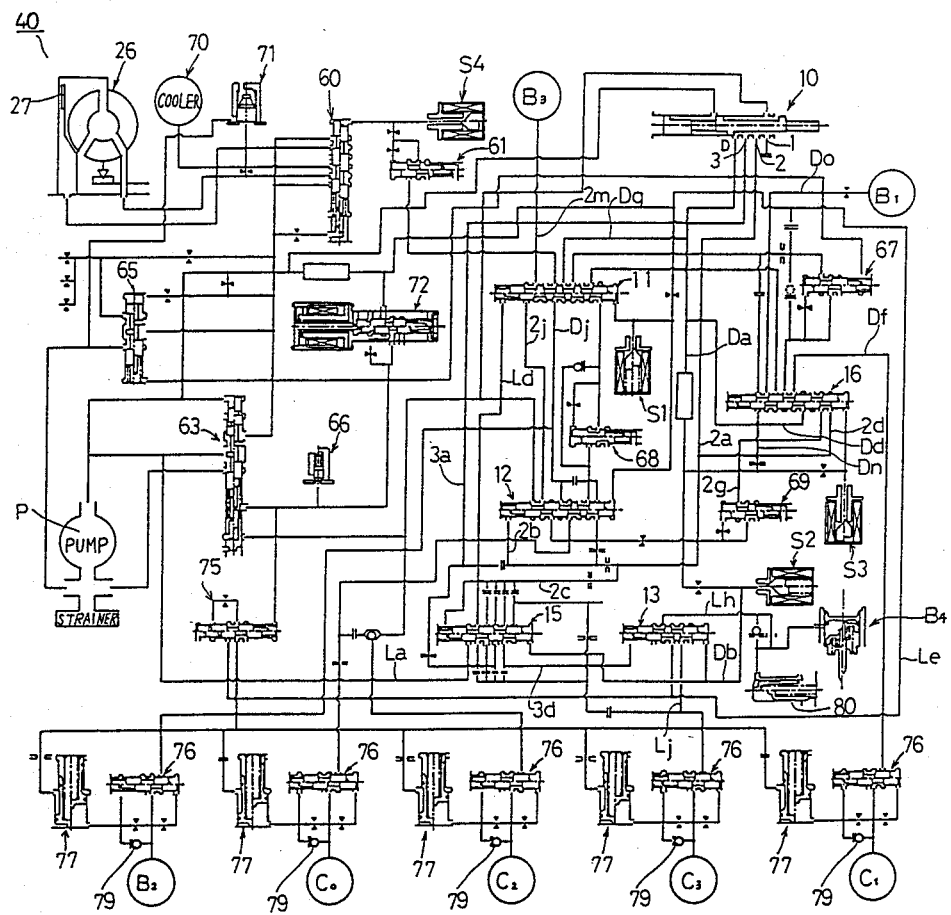
FIG. 3 is a diagrammatic view of a hydraulic control device applied to a transmission.

The five speed automatic transmission 21 is controlled and operated by a hydraulic circuit 40 shown in FIG. 3.

In the hydraulic circuit 40, $C_0$, $C_1$, $C_2$ and $C_3$ are the hydraulic servos for the clutches, and $B_1$, $B_2$, $B_3$ and $B_4$ are the hydraulic servos for the brakes. 10 is the manual valve, the shift valve for shifting from range 1 to 2 is the third shift valve 13, the shift valve for shifting from range 3 to 4 is the second shift valve 12, the fourth shift valve for shifting from range 4 to 5 is the shift valve 16, and 15 is the down shift control valve. S1 is the first solenoid valve to control the first and second shift valves 11 and 12. S2 is the second solenoid valve to control the third shift valve 13 and the down shift control valve 15. S3 is the third solenoid valve to control the shift valve 16. 60 is a lock-up control valve and S4 is the fourth solenoid valve to duty control the lock-up control valve 60, and 61 is a lock-up modular valve to stabilize the duty control by the fourth solenoid valve S4. 63 is a primary regulator valve, 65 is a secondary regulator valve, 66 is a pressure release valve, 67 is a first modulator valve, 68 is a second modulator valve and 69 is a low modulator valve. 70 is a cooler, 71 is a cooler by-pass valve and 72 is a throttle valve having a linear solenoid valve to control line pressure up to a desirable level, 75 is an accumulator control valve, 26 is the torque converter, 27 is the lock-up clutch, and P is a hydraulic pump. The first hydraulic servo for clutch $C_1$, that of the second $C_2$, that of the third $C_0$, and the second hydraulic servo for brake $B_2$ are connected to a regulator valve 76, accumulator 77 and a check valve 79. An accumulator 80 (installation type) is connected to the fourth brake hydraulic servo $B_4$. In FIG. 3, a symbol like an electrical condenser in the line between lines 2b and 3a shows a separator plate to block the oil path so that the hydraulic device can be utilized for a valve body of a four speed automatic transmission.

An explanation will now be given of the operation of this embodiment. The five speed automatic transmission 21 provides a first to a fifth speed in respective ranges (R, D, 3, 2 and 1) as set by the manual valve 10. At each speed position of the manual valve, the first to the fourth solenoid valves S1, S2, S3, and S4 in the hydraulic control circuit 40 operate in accordance with the conditions shown in FIG. 4 and the clutches $C_0$–$C_3$, the brakes $B_1$–$B_4$, and the one-way clutches $F_0$–$F_3$ are operative or inoperative as shown in FIG. 4.

At the first speed in the range D, the first solenoid valve S1 is OFF (supply-condition), the second solenoid valve S2 is ON (drain-condition) and the third solenoid valve S3 is OFF (drain-condition). As shown in FIG. 1, the first shift valve 11 and the second shift valve 12 are in the "upper half position", and the third shift valve 13, the fourth shift valve 16 and the down shift control valve 15 are in the "lower half position". In this condition, line pressure from the port D of manual valve is applied to the first clutch hydraulic servo $C_1$ through the oil path Da, Dd, the port Dc, De of the fourth shift valve 16 and the oil path Df. Line pressure $P_L$, through the oil path Le is applied to the fourth brake hydraulic servo $B_4$ through the port Lf, Lg of the third shift valve 13 and the oil path Lh. By this motion in the circuit, the automatic transmission 21 engages the first forward clutch C1, and the fourth brake $B_4$ operates. Then, the rotation of the input shaft 29 is transmitted to the ring gear R1 of the single unit 30 through the clutch C1. At this time, the ring gear $R_2$ of the dual unit 31 is constrained by the second one-way clutch $F_2$, and rotates the sun gear S without load in reverse; and the common carrier CR is rotated and much retarded. The rotation is transmitted by the counter drive gear 32 to the counter driven gear 35 of the under drive mechanism 25. The under drive mechanism 25 is in "under drive condition" due to the operation of the fourth brake $B_4$ and the fourth one-way clutch $F_3$. Consequently, the automatic transmission 21 as a whole operates in the first speed by the combination of the first speed of the four speed automatic transmission 23 and the under drive condition of the under drive mechanism 25.

At the second speed in the range D, the first solenoid valve S1 is changed to ON (drain-condition). As shown in FIG. 1, the first shift valve 11 and the second valve 12 are in the "lower half position". In this condition, line pressure from the port D of the manual valve 10 is applied to the second brake hydraulic servo $B_2$ through the oil path Dg, the port, Dh, Di of the shift valve 12 and the oil path Dj. By this motion in the circuit, the first forward clutch C1 is engaged and the second brake $B_2$ is operated. Then, the rotation of sun gears is restrained by the first one-way clutch F1. The rotation of the ring gear $R_1$ of the single unit 30 rotates the ring gear $R_2$ of the dual unit 31 without load, and the carrier CR is rotated and retarded. The rotation is transmitted from the counter drive gear 32 to the counter driven gear 35 of the under drive mechanism 25. The under drive mechanism 25 is in "under drive condition". Consequently, the automatic trasmission 21 as a whole operates in the second speed by the combination of the second speed of the four speed automatic trasmission 23 and the under drive condition of the under drive mechanism 25.

At the third speed of the range D, the second solenoid valve S2 is changed to OFF (supply-condition). The third shift valve 13 and the down shift control valve 15 are in the "upper half position". In this condition, line pressure from the oil path La is applied to the right control oil chamber 11b of the shift valve 11. Line pressure of the oil path Le is applied to the fourth clutch hydraulic servo $C_3$ through port Lf, Li of the shift valve 13 and the oil path Lj. In addition, the fourth brake hydraulic servo $B_4$ is released at the same time the fourth clutch $C_3$ is engaged, so that the under drive mechanism 25 is directly connected with the automatic transmission 23. Consequently, the automatic transmission 21 as a whole operates at the third speed by the combination of the second speed of the four speed automatic transmission 23 and the direct coupling of the under drive mechanism 25.

At fourth speed in the range D, the first solenoid valve S1 is also changed to OFF (supply-condition). Line pressure is applied to the right control oil chamber 12a of the second shift valve 12. The second shift valve 12 is shifted to the "upper half position". Although line pressure is applied to the right control oil chamber 11a of the first shift valve 11, the first shift valve 11 is kept at the "lower half position" because the chamber 11b is already pressurized and by the reaction force of the spring. In this condition, line pressure from the port D of the manual valve 10 is applied to the third clutch hydraulic servo $C_0$ through the oil path Dg, the port Dh, Di, the oil path Dj, the port Dk, Dl of the second shift valve 12, and the oil path Dm. By this motion in the circuit, the first forward clutch C1 and the fourth clutch C3 are connected, and the second brake $B_2$ operates and the third clutch $C_0$ is engaged. Then, the rotation of the input shaft 29 is transmitted to the ring gear R1 of the single unit 30 through clutch C1. At this time, the rotation of the input shaft 29 is transmitted to the ring gear R2 of the dual unit 31 through the clutch $C_0$, and the components of the planetary gear units 30 and 31 rotate together, and by the carrier CR the rotation of the input shaft 29 is transmitted to the counter drive gear 32 with the same rotation speed. Consequently, the automatic transmission 21 as a whole operates in the fourth speed by the combination of the four speed automatic transmission 23 and the direct coupling condition of the under drive mechanism 25.

At the fifth speed in the range D, the third solenoid valve S3 is changed to ON (supply-condition), and the fourth shift valve 16 is in the "upper half position". The first clutch hydraulic servo $C_1$ is drained through the port De and the drain port. Line pressure is applied to the first brake hydraulic servo $B_1$ through the oil path Da, the port Dn, Dr and the oil path Do. By this motion in the circuit, the first forward clutch C1 is released and the first brake $B_1$ operates. Then, the rotation of input shaft 29 is transmitted to the ring gear R2 of the dual unit 31 through the clutch $C_0$. At this time, the sun gear S is restrained. The input shaft 29 rotates the ring gear R1 of the single unit rapidly without load, and such high speed rotation is transmitted to the counter drive gear 32 as an "over drive". Consequently, the automatic trasmission 21 as a whole operates in the fifth speed by the combination of the four speed automatic transmission 23 and direct coupling of the under drive mechanism 25.

At the idle condition in the range D, the first solenoid is OFF and the second and third solenoids are ON, and line pressure to the first clutch servo $C_1$ is reduced by the $C_1$ modulator valve 67 to the level just below that at which the clutch is connected and the first brake B1 operates. The load is released from input shaft 29, creeping is prevented and the first clutch $C_1$ is connected when the mode is changed to the first speed; because the first brake $B_1$ operates, backward motion of the vehicle on a slope is prevented.

When shifting from the N to the R range, when the vehicle speed is less than a certain level (less than 7 km/h) or 0 (zero) the first and third solenoids are OFF and the second solenoid is ON; and clutch C2 is connected and the third brake $B_3$ (first reverse) operates. The rotation of the input shaft 29 is transmitted to the sun gear S through the clutch C2. Under this condition, the input shaft 29 rotates the ring gear R1 of the single unit 30 and the carrier CR in the reverse direction because the ring gear R2 of the dual unit 31 is restrained by the third brake B3. The reverse rotation of the carrier CR is transmitted to the under drive mechanism 25 which is in the drive condition through the counter drive gear 32.

When shifting from the N to the R range when the vehicle speed is more than a certain level (7 km/h), the solenoid valve S1 is ON, the first shift valve 11 and the second shift valve 12 are shifted, and the third brake B3 is released. By this motion, shifting to R range when a vehicle is moving at this speed is prevented.

When the manual valve 10 is shifted to the range 3 by the shift lever or switch, line pressure is applied to the port 3 as well as to port D.

In range 3, the first and second speeds are the same as those in range D, but the third and fourth speeds have different gear ratios. At the third speed in the range 3, the solenoid valves S1, S2 and S3 are all OFF. The solenoid S1 is in the "supply condition", line pressure is applied to the right control oil chambers $11a$ and $12a$ of the first and second shift valves 11 and 12, and the second shift valve 12 is shifted to "upper half position". However, the first shift valve 11 is kept at the "lower half position" because the left control oil chamber $11b$ is supplied with line pressure by the motion of the down shift control valve 15 the same as in the third, fourth, and fifth speed in the range D. Consequently, line pressure from the port D is applied to the second brake servo B2 through the oil path Dg, the ports Dh, Di of the first shift valve 11 and the oil path Dj; furthermore, line pressure of the oil path Dj is applied to the third clutch hydraulic servo $C_0$ through the ports Dk, Dl of the first shift valve 12 and the oil path Dm. On the other hand, the second solenoid valve S2 is in the "supply condition", and line pressure is applied to the right control oil chamber $15a$ and $13a$ of the down shift control valve 15 and the third shift valve 13, so that the down shift control valve is shifted to the "upper half condition". But the third shift valve 13 is kept at the "lower half position" by the combination of the line pressure from the port 3 applied to the left control oil chamber $13b$ through the oil path $3a$, the ports $3b$ and $3c$ of the down shift control valve 15 and the oil path $3d$, and the spring in said control oil chamber $13b$. Line pressure in the oil path Le is applied to the fourth brake hydraulic servo B4 through the ports Lf, Lg and the oil path Lh the same as for the first and second speeds. In the automatic transmission 21, the first clutch $C_1$ and the third clutch $C_3$ are connected, and the second brake $B_2$ and the fourth brake $B_4$ operate. The four speed automatic transmission mechanism 23 is placed in a direct coupling condition and the under drive mechanism 25 is placed in the drive condition. Then the third speed of range 3 is obtained. This condition, in general, provides a larger gear ratio than that of the third speed of range D, the engine braking is more effective and acceleration becomes better.

At the fourth speed in the range 3, the third solenoid valve S3 is shifted to ON. The fourth shift valve 16 is changed to the "upper half position", and line pressure from the port D is applied to the first brake hydraulic servo B1 through the ports Dn, Dr and the oil path Do. Consequently, in the automatic transmission 21, the third clutch $C_3$ is connected, and the first, second and fourth brakes B1, B2 and B4 operate. Thus, the four speed automatic transmission mechanism 23 is placed in the drive condition and the under drive mechanism 25 is in the under drive condition. As a whole, the transmission operates at the fourth speed of range 3. This condition, in general, provides a larger gear ratio than that of the fourth speed in the range D.

When the manual valve 10 is shifted to the position for range 2, line pressure at the port L is applied to port 2 as well as ports D and 3.

At the first speed of range 2, the solenoid valves S1, S2 and S3 are in the same conditiion as for the first speed in ranges D and 3, line pressure from port 2 is applied to the port $2e$ of the fourth shift valve 16 through the oil path $2a$ and $2d$, and because the fourth shift valve 16 remains in the "lower half position", line pressure is also applied to the port $2h$ of the second shift valve 12 through the port $2f$ and the oil path $2g$. On the other hand, because line pressure from the port 2 is applied to the left control oil chamber $12b$ of the second shift valve 12 through the oil paths $2a$ and $2b$, the second shift valve 12 remains in the "lower half position" in spite of line pressure being applied to the right control oil chamber $12a$ due to the solenoid valve S1 being OFF. Accordingly, because the second shift valve 12 remains in "lower half position", line pressure at the port $2h$ is applied to the third brake hydraulic servo B3 through the port $2i$, the oil path $2j$, the port $2k$ and $2l$ of the first shift valve 11, which is in the "upper half position", and the oil path $2m$. At this time, line pressure applied to the third brake hydraulic servo B3 is suitably adjusted by the low modulator valve 69 located in the oil path $2g$ as shown in FIG. 3. Accordingly, at the first speed of range 2, the third brake B3 is applied in addition to the conditions for the first speed in range D. Due to this action, the gear ratio is the same as the first speed in the range D; however, at the time when the engine is used as a brake, this first speed in range 2 still maintains first speed because of the ring gear R2 being constrained by the third brake B3, whereas in the range D, the transmission is disconnected by the one-way clutch F2.

At the second speed of range 2, the solenoid valve S2 is changed to OFF, and line pressure is applied to the right control oil chamber $15a$ of the down shift control valve 15 and the port $13a$ of the third shift valve 13. Thus the third shift valve 13 is shifted to the "upper half position". On the other hand, as line pressure is applied to the left control oil chamber $15b$ of the down shift control valve 15 through the oil path $2a$ and $2c$, the down shift control valve 15 remains in the "lower half position" due to the action of the spring. Accordingly, because the down shift control valve 15 remains in the "lower half position", line pressure in the oil path Le is applied to the fourth clutch hydraulic servo C3 through the port Lf, Li and the oil path Lj. Accordingly, the first and the fourth clutches C1 and C3 are connected and the third brake B3 operates. Thus, the four speed automatic transmission mechanism 23 is placed in first speed and the under drive mechanism 25 is placed in a directly coupling condition; as a whole, the second speed of range 2 is obtained. In this condition, in general, the gear ratio is greater than for the second speed of range D and range 3. At this time, as in the case of the first speed, the operation of the engine as a brake is kept at second speed because the third brake B3 operates. In range 2, it is possible to obtain second and third speeds like those in range D as shown in parentheses.

Furthermore, at range 1, the first speed is the same as the first speed in range 2. As shown in the parentheses, a second speed the same as that of the second speed in range 2 and a third speed the same as the third speed in range D can be obtained.

In the hydraulic circuit 40 described above, if the solenoid valves S1, S2 and S3 fail, the transmission is automatically shifted in each, i.e. to the fourth speed in range D, third speed in range 3, second speed in ranges 2 and 1, and by operation of the manual valve 10 by hand, it is possible to obtain a suitable driving condition.

The above embodiment has been explained for a five speed automatic transmission having a four speed automatic transmission mechanism and an under drive mechanism. However, the present invention can be applied to a four speed automatic transmission having the three speed automatic transmission mechanism and an under or over drive mechanism, and to other multiple speed automatic transmissions, etc.

What is claimed is:

1. In an automatic transmission of a vehicle having a transmission gear mechanism through which power is transmitted in a respective one of power transmitting paths defined therethrough: frictional engaging means operatively connected to the transmission gear mechanism for selecting the power transmitting path through which power is transmitted in the transmission gear mechanism; hydraulic servos operatively connected to the frictional engaging means for operating or releasing or for engaging or disengaging the frictional engaging means; first, second and third shift valves operatively hydraulically connected to the respective hydraulic servos and a source of line pressure and which shift valves are normally resiliently held in a first position and are movable to a second position by application of line pressure thereto in opposition to the normal resiliently held position, and in which respective positions the line pressure is supplied toward the servos and the supply of line pressure is interrupted during forward travelling of the vehicle to provide different speeds which can be output by the transmission while the vehicle is travelling forward; and a manual valve operatively hydraulically connected in the transmission between a source of line pressure and the shift valves and which manual valve is settable to a plurality of ranges of forward speed; a hydraulic control device comprising:
    a first solenoid valve operatively hydraulically connected between the source of line pressure and said first and said second shift valves for controlling supply of hydraulic fluid to said first and said second shift valves for use in controlling the positions thereof;
    a down shift control valve normally resiliently held in a first position and movable to a second position by application of line pressure thereto in opposition to the normal resiliently held position;
    a second solenoid valve operatively hydraulically connected between said manual valve and said third shift valve and said down shift control valve for controlling supply of hydraulic fluid to said third shift valve and said down shift control valve for use in controlling the positions thereof; and
    hydraulic fluid passages between said manual valve and said down shift control valve and between said down shift control valve and said third shift valve for, when said manual valve is at one of the ranges, line pressure is applied to said third shift valve through said down shift control valve to hold said third shift valve at the first position when said third shift valve and said down shift valve are supplied only with hydraulic fluid through said second solenoid valve, whereby when said manual shift valve is at said one of said ranges, said third shift valve is held in said first position regardless ON condition or OFF condition of said second solenoid valve.

2. A hydraulic control device according to claim 1 wherein said one range of said manual valve is a third range.

3. A hydraulic control device according to claim 1 wherein said automatic transmission mechanism is constituted by a main transmission mechanism and a sub transmission mechanism, and said first and second shift valves are connected for controlling hydraulic servos in said main transmission mechanism and said third shift valve is connected for controlling hydraulic servos in said sub transmission mechanism.

4. A hydraulic control device according to claim 1 further comprising further hydraulic fluid passages between said down shift control valve and said first and second shift valves for, when said manual valve is at said one range, and said down shift control valve is kept at the one position, the supply of hydraulic fluid controlled by said first solenoid valve controls the position of said first shift valve and said second shift valve to hold them in respective second positions, and when said down shift control valve is changed to the second position, line pressure is applied to said first shift valve through said down shift control valve to hold said first shift valve in a second position against the supply of hydraulic fluid from said first solenoid valve.

5. In an automatic transmission of a vehicle having a transmission gear mechanism through which power is transmitted in a respective one of power transmitting paths defined therethrough: frictional engaging means operatively connected to the transmission gear mechanism for selecting the power transmitting path through which power is transmitted in the transmission gear mechanism; hydraulic servos operatively connected to the frictional engaging means for operating or releasing or for engaging or disengaging the frictional engaging means; first, second and third shift valves operatively hydraulically connected to the respective hydraulic servos and a source of line pressure and which shift valves are normally resiliently held in a first position and are movable to a second positoin by application of line pressure thereto in opposition to the normal resiliently held position, and in which respective positions the line pressure is supplied toward the servos and the supply of line pressure is interrupted during forward travelling of the vehicle to provide different speeds which can be output by the transmission while the vehicle is travelling forward; and a manual valve operatively hydraulically connected in the transmission between a source of line pressure and the shift valves and which manual valve is settable to a plurality of ranges of forward speed; a hydraulic control device comprising:
    a first solenoid valve operatively hydraulically connected between the source of line pressure and said first and said second shift valves for controlling supply of hydraulic fluid to said first and said second shift valves for use in controlling the positions thereof;
    a down shift control valve;
    a second solenoid valve operatively hydraulically connected between said manual valve and said third shift valve and said down shift control valve for controlling supply of hydraulic fluid to said third shift valve and said down shift control valve for use in controlling the positions thereof; and
    hydraulic fluid passages between said manual valve and said first, second and third shift valves and between said manual valve and said down shift control valve for, when said manual valve is at one of the ranges, said oil passages are connected to said shift valves and said down shift control valve for actuating the appropriate hydraulic servos corresponding to said one range, and for, when said manual valve is changed to another of the ranges, line pressure is applied to said second shift valve and to said down shift control valve in the same direction at the normal resilient holding of said second shift valve and said down shift valve for causing said second shift valve and said down shift control valve to be held in the first positions thereof regardless of the ON condition or OFF condition of said first and second solenoid valves.

6. A hydraulic control device as claimed in claim 5 wherein said one range of said manual valve is a second range.

7. A hydraulic control device according to claim 5 wherein said automatic transmission mechanism is constituted by a main transmission mechanism and a sub transmission mechanism, and said first and second shift valves are connected for controlling hydraulic servos in said main transmission mechanism and said third shift valve is connected for controlling hydraulic servos in said sub transmission mechanism.

8. A hydraulic control device as claimed in claim 5 in which when said manual valve is at said another of said ranges, only said second shift valve is held against movement to the second position.

* * * * *